Nov. 23, 1926.
LA MONT A. McDOWELL
VEHICLE BODY CONSTRUCTION
Filed May 3, 1926
1,607,635
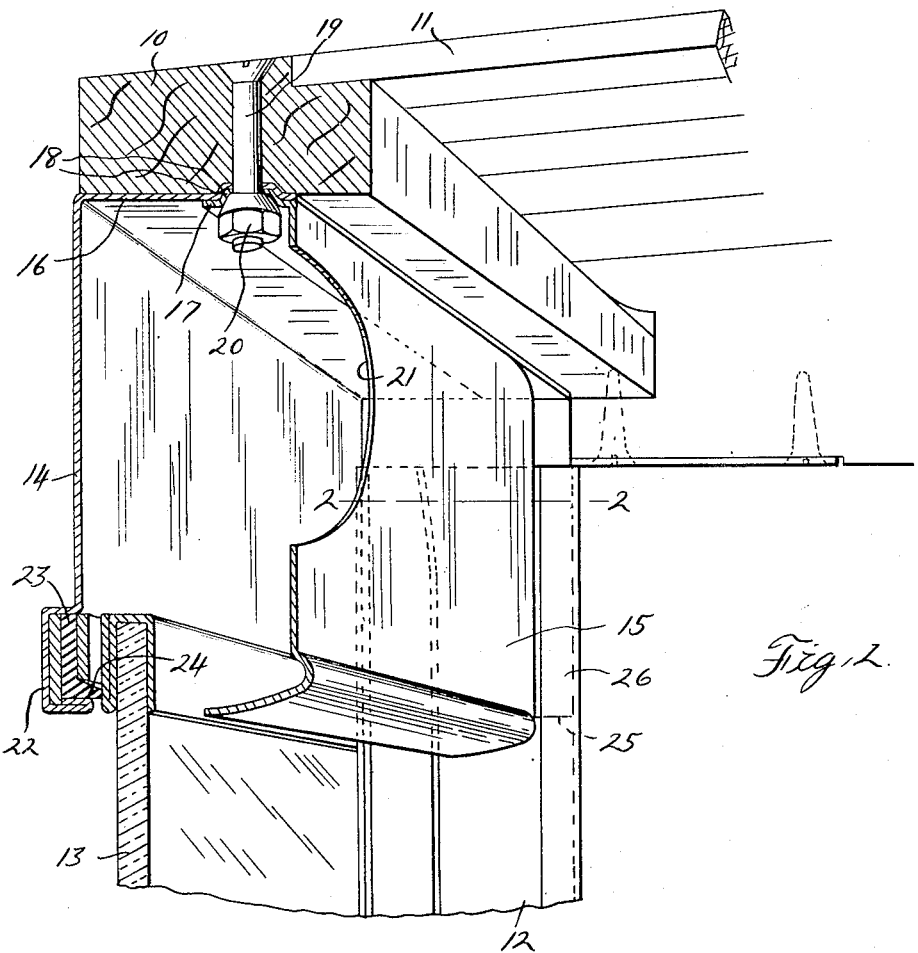
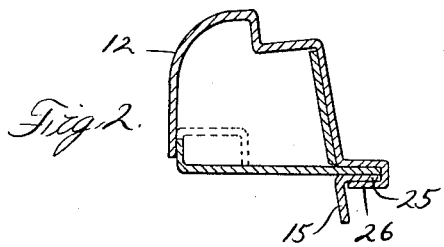
Inventor
LaMont A. McDowell
By Whittemore, Hulbert, Whittemore & Belknap
Attorneys Patented Nov. 23, 1926.

1,607,635

UNITED STATES PATENT OFFICE.

LA MONT A. McDOWELL, OF DETROIT, MICHIGAN, ASSIGNOR TO HUPP MOTOR CAR CORPORATION, OF DETROIT, MICHIGAN, A CORPORATION OF VIRGINIA.

VEHICLE BODY CONSTRUCTION.

Application filed May 3, 1926. Serial No. 106,563.

This invention relates to vehicle body constructions and more particularly to front end constructions involving a novel design of windshield header.

Among the objects of the invention is that of producing a simple and durable windshield header which may be economically manufactured and assembled and which will provide a pocket or receptacle designed to receive the upper edge of a vertically slidable windshield.

The various objects, advantages and novel details of construction of the invention will be made more apparent as this description proceeds, especially when considered in connection with the accompanying drawing, wherein—

Figure 1 is a fragmentary perspective view of a vehicle construction showing my improved invention.

Figure 2 is a fragmentary sectional view taken substantially on the plane indicated by line 2—2 of Figure 1.

Referring now particularly to the drawing it will be noted that there is illustrated a roof frame member 10 which supports the roof members 11, it being understood that the member 10 constitutes a header element extending across the front of the vehicle between the two front pillars 12, only one of which, however, is shown. The reference character 13 indicates a windshield which is vertically slidable and with the upper edge of which the hollow windshield header about to be described, cooperates.

The improved header constituting the particular subject matter of this invention includes two plate members 14 and 15 which may conveniently be designated front and rear plates which are provided respectively with laterally bent flanges 16 and 17 at their upper edges. These flanges are opposed or in other words, extend inwardly of the header toward one another and are adapted to be arranged in superposed or overlapping relation in the manner clearly illustrated in the drawing. As shown, however, the flange 16 is of a somewhat greater width than the flange 17 so that the edge of the flange 16 extends to a point substantially in alignment with the plane of the plate 15. The overlapping flanges of the two plate members are provided with one or more registering depressions 18 apertured for the reception of fastening elements 19 which, in the embodiment herein illustrated, are in the form of bolts passed downwardly through the frame element 10. Securing nuts 20 cooperate with the fastening elements 19 for fastening the flanges 16 and 17 rigidly to the frame member 10, it being noted that these nuts engage or seat in the depressions 18. One of the plate members, preferably the rear plate member 15, may be cut away at suitable points as indicated at 21 so that access may be had to the interior of the hollow header for tightening the nuts 20.

One of the plate members, preferably the outer plate member 14 is provided adjacent its lower edge with a longitudinally extending depression 22 for the reception of a weather strip 23 having a laterally projecting portion 24 adapted to engage the windshield 13 for weather-proofing the joint between these parts. The other plate member 15 has its lower edge bent to provide or simulate a finish strip or molding 24 extending laterally toward the windshield to a point adjacent thereto for substantially closing the open lower side of the hollow header. The connection between the vertical edges of the hollow header and the adjacent pillars or posts 12 is effected by providing vertical flanges 25 on the adjacent vertical edges of the plate member 15 which flanges engage under the return bent flange 26 of the pillar 12.

From the foregoing it will be readily apparent that the invention contemplates a hollow windshield header providing a pocket or space for receiving the upper edge of the slidable windshield together with means for exteriorly weather-proofing the connection between the header and the windshield and also for closing, by an integrally formed finish strip, the remaining space between the windshield and the inner wall of the header. It will furthermore be noted that the header comprises only two sections which may be conveniently united together and secured to the roof frame element by the same fastening means. Furthermore the apertured depressions 18 not only constitute aligning means for the header sections but align the header with respect to the roof frame element 10. Thus, a simple, efficient, and durable construction is obtained and one which may be economically manufactured and quickly and easily assembled.

While an embodiment of the invention has been described and illustrated somewhat in detail, reservation is made to make such changes in the details of construction as may come within the purview of the accompanying claims.

What I claim as my invention is:

1. In a vehicle body construction, the combination with a roof element and a windshield, of a header comprising two plate members provided with opposed overlapping edge portions, and means passing through said overlapping portions and engaging said roof element for securing said plate members in spaced relation to one another to provide a receiving pocket for the edge of said windshield.

2. In a vehicle construction, the combination with a roof element and a windshield, of a hollow header for receiving said windshield comprising a pair of plate members provided with oppositely bent edge portions arranged in overlapping relation and securing means passed through said overlapping portions and engaging said roof element.

3. In a vehicle header construction, the combination with a roof frame member and a windshield, of a hollow header for receiving said windshield comprising a pair of spaced members provided with laterally bent flanges at one edge thereof arranged in overlapping relation and securing means passed through said overlapping portions and engaging said roof frame member.

4. In a vehicle header construction, the combination with a roof frame member and a windshield, of a hollow header for receiving said windshield comprising a pair of spaced plate members provided with laterally bent portions at one edge thereof arranged in overlapping relation, registering apertured depressions formed in said overlapping portions and headed securing elements passed through said apertures into said roof frame member with the heads thereof engaging said depressions.

5. In a vehicle header construction, the combination with a roof frame member and a windshield, of a hollow header for receiving said windshield comprising a pair of spaced plate members provided with laterally bent portions at one edge thereof arranged in overlapping relation, means for securing said overlapping portions to said roof frame member and a weatherstrip receiving depression formed in one of said plate members adjacent its lower edge.

6. In a vehicle header construction, the combination with a roof frame member and a windshield, of a hollow header for receiving said windshield comprising a pair of spaced plate members provided with laterally bent portions at one edge thereof arranged in overlapping relation, means for securing said overlapping portions to said roof frame member and a finish strip formed integrally with the lower edge of one of said plate members.

7. In a vehicle header construction, the combination with a roof frame member and a windshield of a hollow header for receiving said windshield comprising a pair of spaced plate members provided with laterally bent portions at one edge thereof arranged in overlapping relation, means for securing said overlapping portions to said roof frame member, a weatherstrip receiving depression formed in one of said plate members adjacent its lower edge, and a finish strip formed integrally with the lower edge of the other of said plate members.

8. In a vehicle header construction, the combination with a roof frame member and a windshield, of a hollow header for receiving said windshield comprising a pair of spaced plate members provided with laterally bent portions at one edge thereof arranged in overlapping relation, means for securing said overlapping portions to said roof frame member, one of said plate members having its lower edge bent to form a finished strip extending laterally to a point adjacent said windshield.

9. In a vehicle body construction, the combination with a roof frame element, pillar and windshield, of a hollow header for receiving the upper edge of said windshield comprising a pair of spaced metallic plates provided with opposed lateral flanges at their upper edge arranged in overlapping relation, means for securing said flanges to said roof frame element and vertical flanges on one of said plates for engagement with said pillars disposed at the ends thereof.

10. In a vehicle header construction, the combination with a roof frame member and a windshield, of a hollow header for receiving said windshield comprising a pair of spaced plate members provided with laterally bent flanges at one edge thereof arranged in overlapping relation, depressions formed in said flanges and adapted upon registration to align said plate members and securing means for attaching said plate members to said roof frame member.

11. In a vehicle header construction, the combination with a roof frame member and a windshield, of a hollow header for receiving said windshield comprising a pair of spaced plate members provided with laterally bent flanges at one edge thereof arranged in overlapping relation, apertured registering depressions formed in said flanges for aligning said plate members and securing means extending through said roof frame member and said apertures for aligning and securing said header with respect to said roof frame member.

In testimony whereof I affix my signature.

LA MONT A. McDOWELL.